US011204451B2

(12) United States Patent
Choi

(10) Patent No.: US 11,204,451 B2
(45) Date of Patent: Dec. 21, 2021

(54) CAMERA MODULE COMPRISING LIQUID LENS AND OPTICAL DEVICE INCLUDING THE SAME

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 182 days.

(21) Appl. No.: 16/492,065

(22) PCT Filed: Mar. 8, 2018

(86) PCT No.: PCT/KR2018/002744
§ 371 (c)(1),
(2) Date: Sep. 6, 2019

(87) PCT Pub. No.: WO2018/164496
PCT Pub. Date: Sep. 13, 2018

(65) Prior Publication Data
US 2021/0132264 A1    May 6, 2021

(30) Foreign Application Priority Data
Mar. 8, 2017    (KR) .......................... 10-2017-0029519

(51) Int. Cl.
  *G02B 3/14*    (2006.01)
  *G02B 7/09*    (2021.01)
  (Continued)

(52) U.S. Cl.
  CPC ................. *G02B 3/14* (2013.01); *G02B 7/09* (2013.01); *G02B 27/646* (2013.01); *G03B 5/00* (2013.01);
  (Continued)

(58) Field of Classification Search
  CPC combination set(s) only.
  See application file for complete search history.

(56) References Cited

U.S. PATENT DOCUMENTS

2007/0153399 A1*  7/2007  Hendriks ............... G02B 15/00
                                                        359/666
2008/0037973 A1   2/2008  Jung
                          (Continued)

FOREIGN PATENT DOCUMENTS

CN    103885153 A    6/2014
CN    105934696 A    9/2016
            (Continued)

OTHER PUBLICATIONS

International Search Report for PCT/KR2018/002744 (PCT/ISA/210) dated Jun. 22, 2018.

*Primary Examiner* — Omar S Ismail
(74) *Attorney, Agent, or Firm* — Birch, Stewart, Kolasch & Birch, LLP

(57) ABSTRACT

An embodiment provides a camera module including a liquid lens including an electrode; and a holder in which the liquid lens is disposed, wherein the holder includes a first body portion including a first hole formed therein; a second body portion spaced apart from the first body portion, the second body portion including a second hole formed therein so as to correspond to the first hole; and a side portion connecting the first body portion and the second body portion to each other, wherein the second body portion includes a support portion supporting the liquid lens and an extension portion extending from the support portion, and wherein the support portion includes a side surface, an upper surface, and a step formed between the side surface and the upper surface.

19 Claims, 9 Drawing Sheets

(51) Int. Cl.
   *G02B 27/64* (2006.01)
   *G03B 13/36* (2021.01)
   *G03B 5/00* (2021.01)
(52) U.S. Cl.
   CPC ...... *G03B 13/36* (2013.01); *G03B 2205/0007* (2013.01)

(56) References Cited

U.S. PATENT DOCUMENTS

| | | | | |
|---|---|---|---|---|
| 2008/0267603 | A1* | 10/2008 | Jung | G02B 7/021 396/111 |
| 2009/0190232 | A1* | 7/2009 | Craen | G02B 3/14 359/666 |
| 2010/0195213 | A1* | 8/2010 | Bolis | G02B 3/14 359/666 |
| 2010/0247086 | A1* | 9/2010 | Tallaron | G02B 13/004 396/133 |
| 2013/0002973 | A1* | 1/2013 | Chen | G02F 1/139 349/15 |
| 2016/0187613 | A1* | 6/2016 | Seo | G02B 7/08 359/666 |
| 2017/0269341 | A1* | 9/2017 | Zimmermann | G02B 7/04 |

FOREIGN PATENT DOCUMENTS

| | | |
|---|---|---|
| JP | 2001-245186 A | 9/2001 |
| JP | 2006-309011 A | 11/2006 |
| JP | 2007-171329 A | 7/2007 |
| JP | 2007-292845 A | 11/2007 |
| JP | 2007-310224 A | 11/2007 |
| JP | 2009-244393 A | 10/2009 |
| KR | 10-2008-0014274 A | 2/2008 |
| KR | 10-2008-0064235 A | 7/2008 |
| KR | 10-2014-0073255 A | 6/2014 |
| TW | 201219875 A | 5/2012 |

* cited by examiner

[FIG. 1]
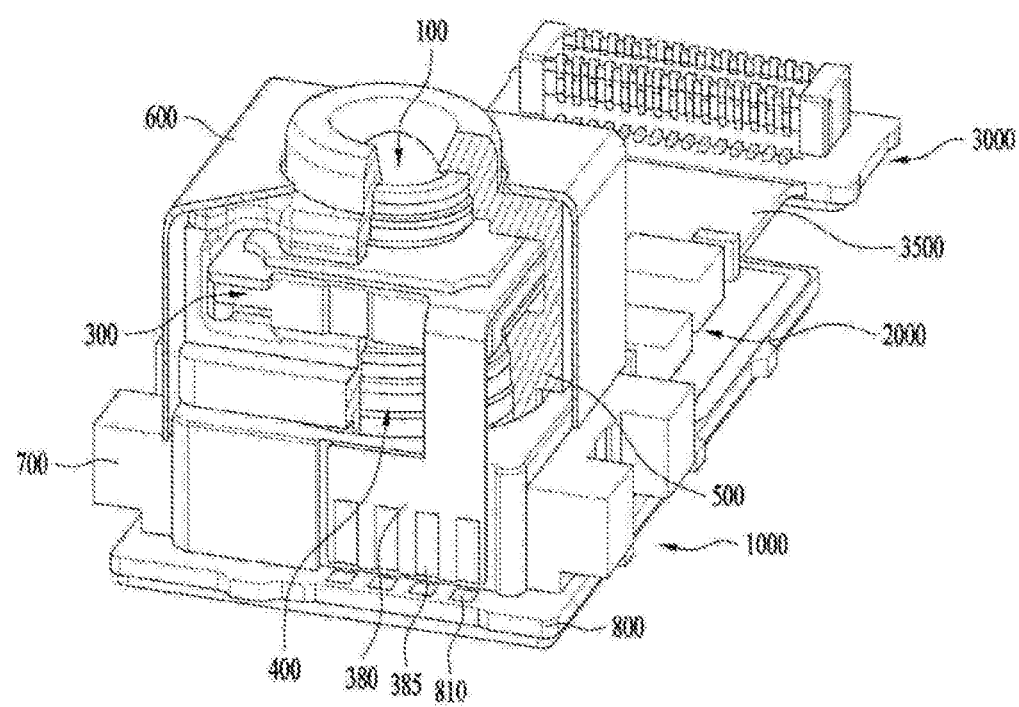

[FIG. 2]
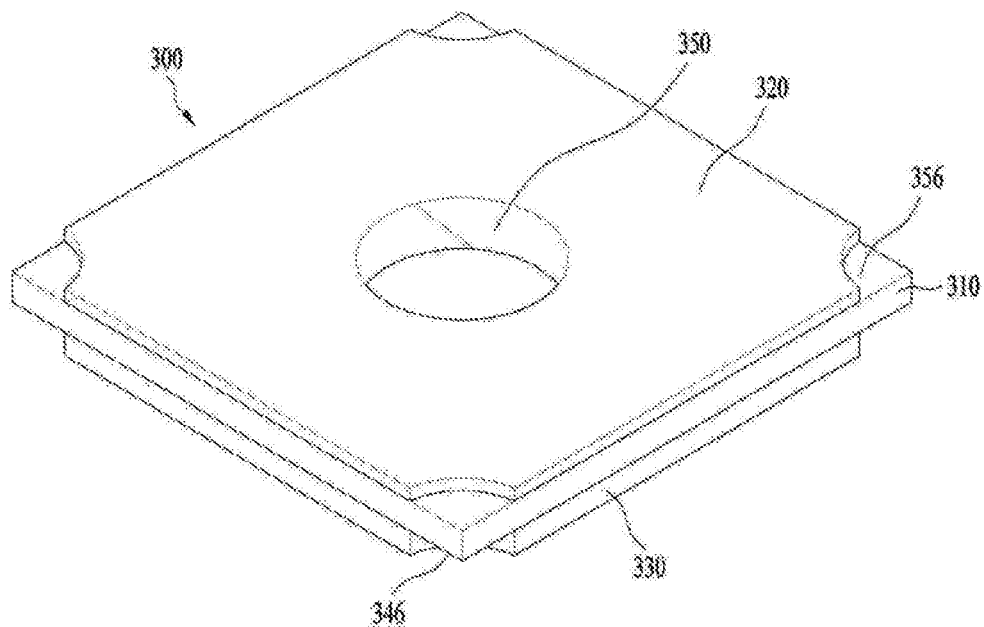

[FIG. 3]
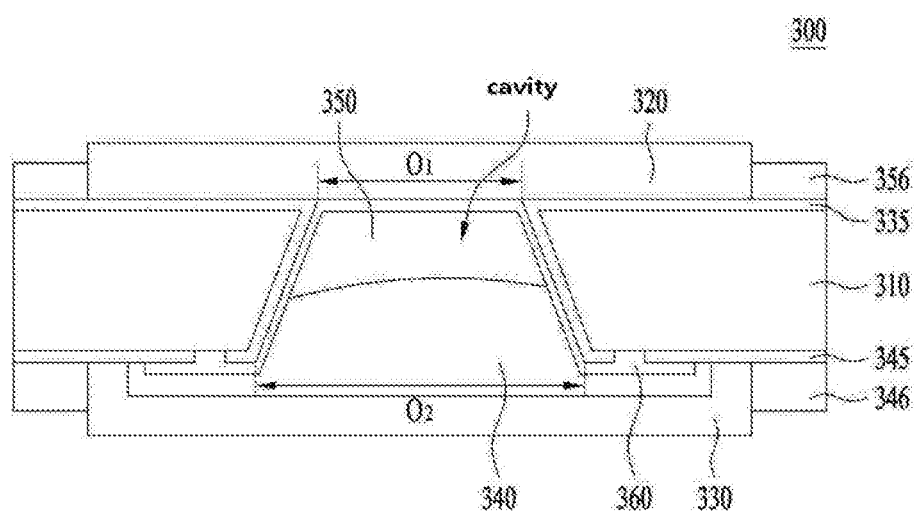

[FIG. 4]
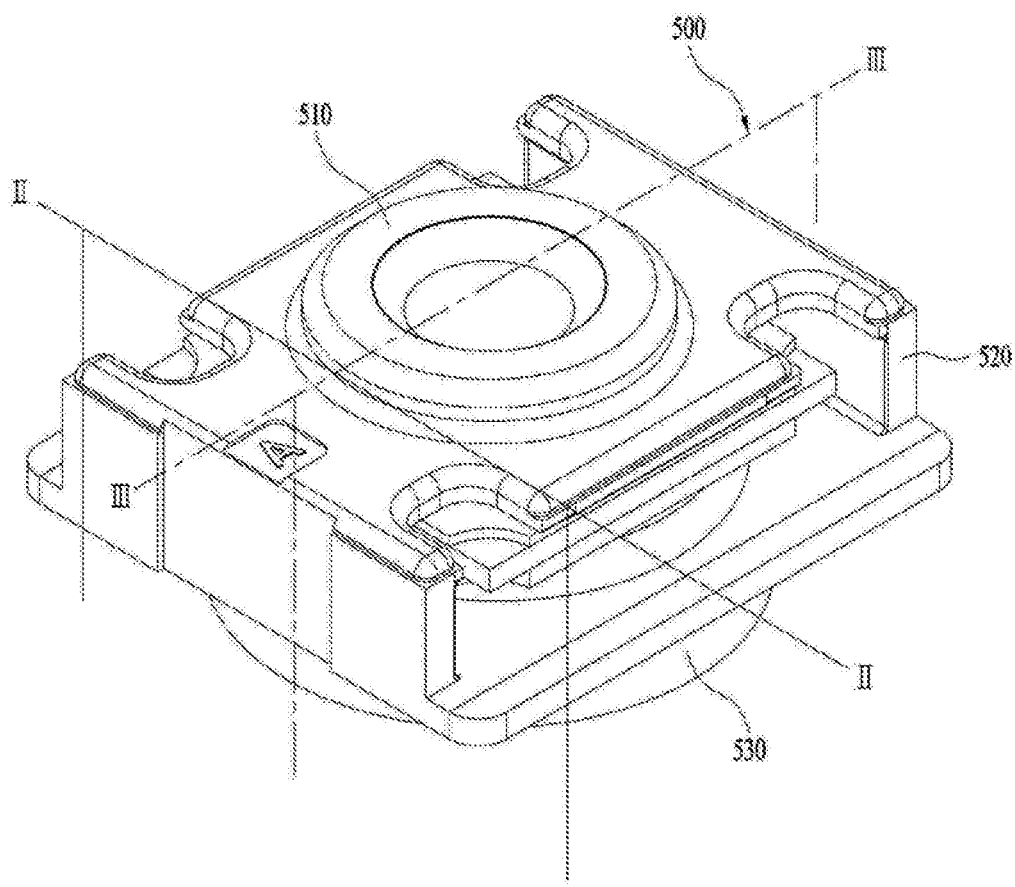

[FIG. 5]
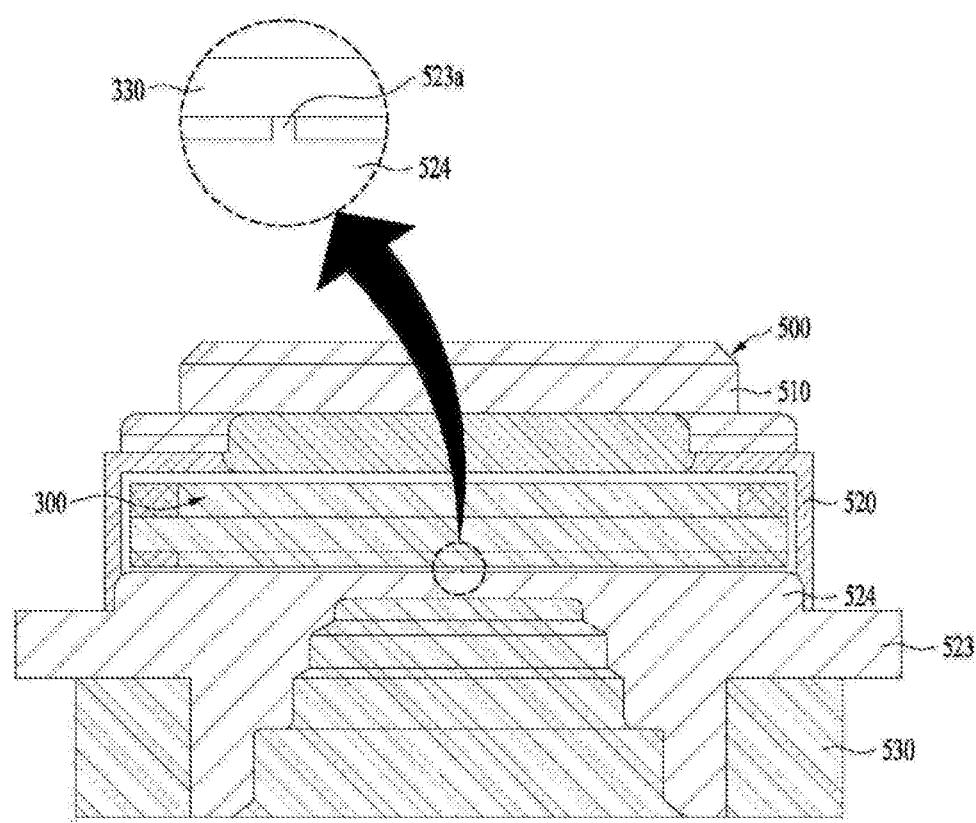

[FIG. 6]
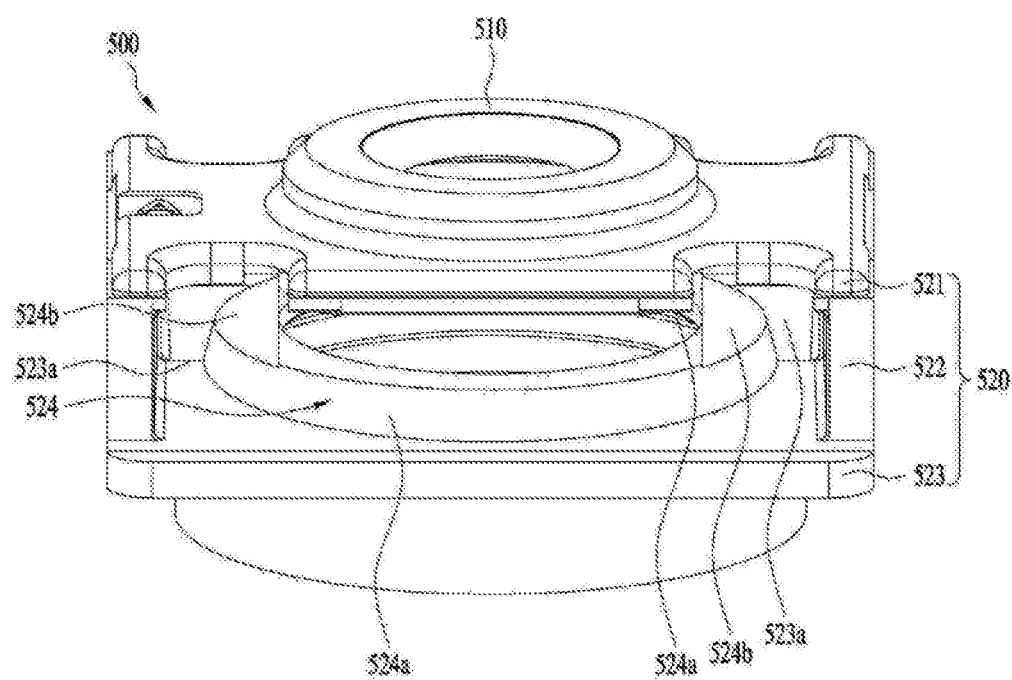

[FIG. 7]
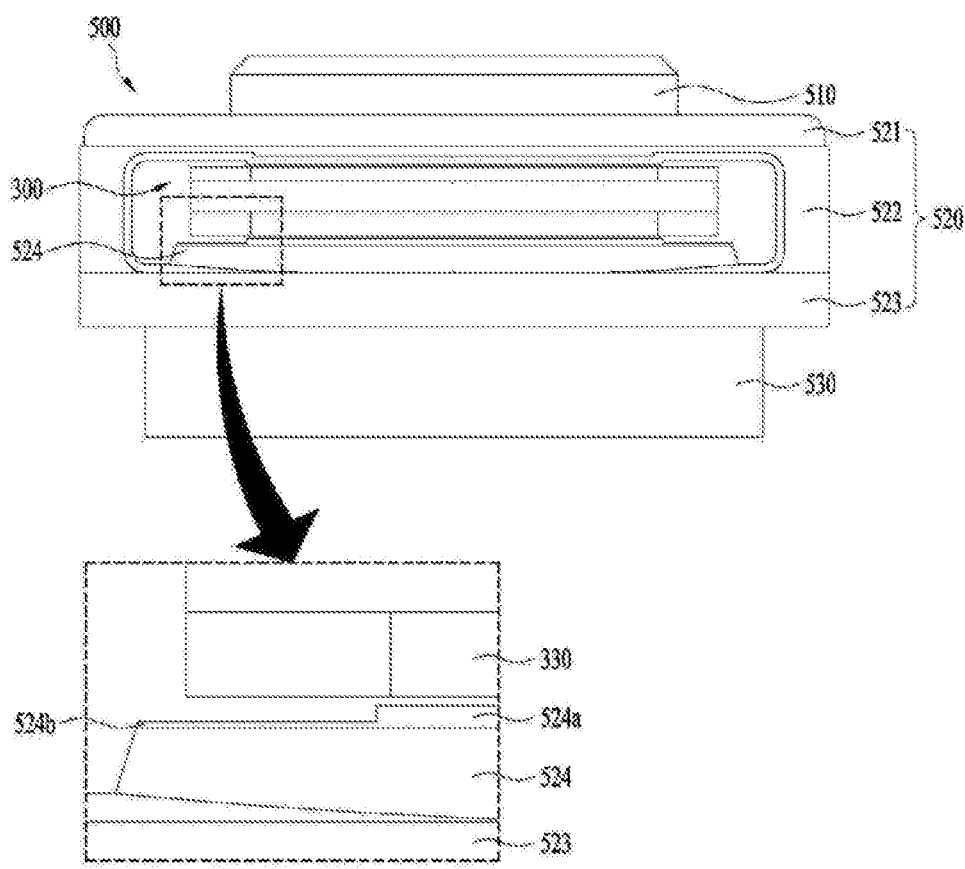

[FIG. 8]
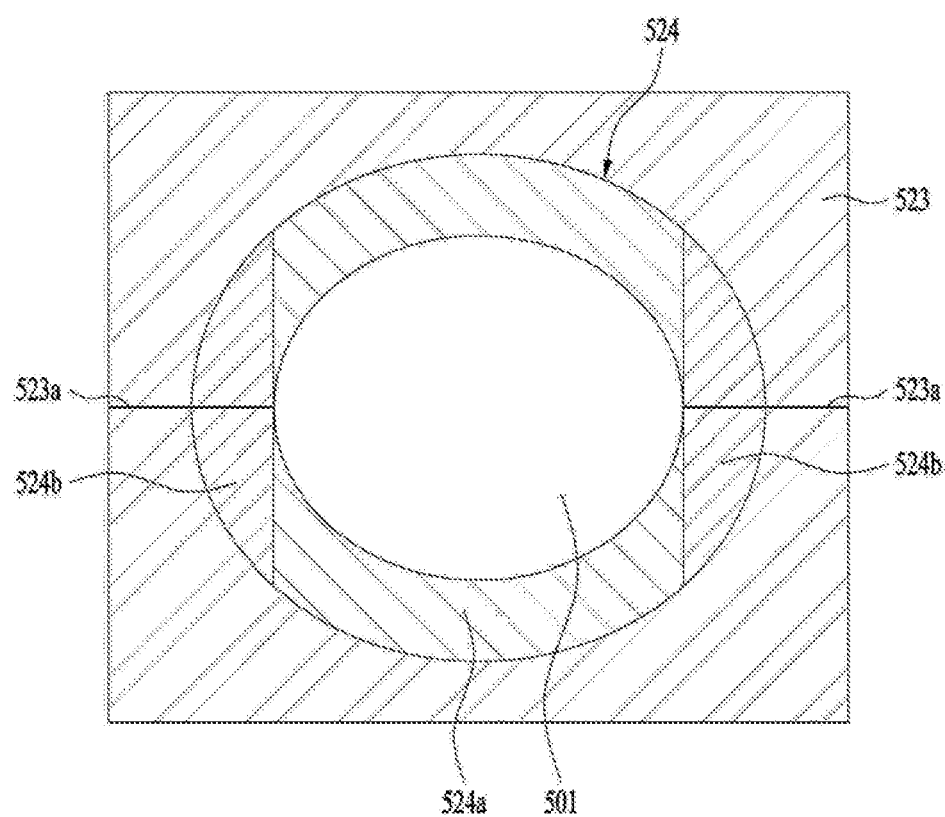

[FIG. 9]
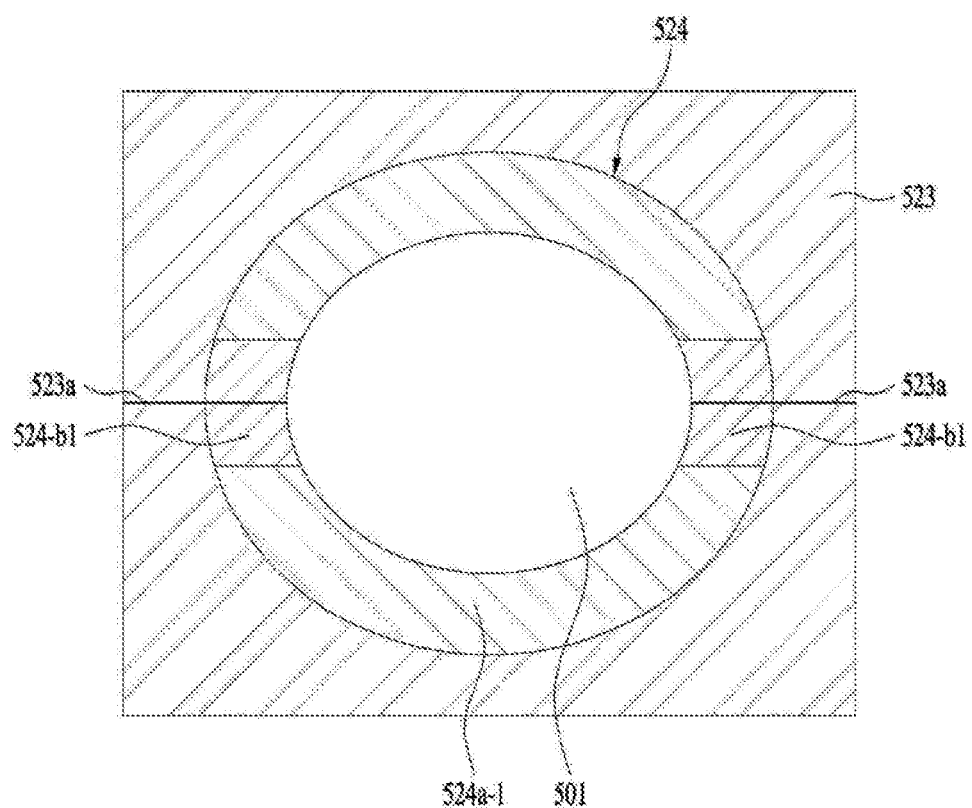

CAMERA MODULE COMPRISING LIQUID LENS AND OPTICAL DEVICE INCLUDING THE SAME

CROSS REFERENCE TO RELATED APPLICATIONS

This application is the National Phase of PCT International Application No. PCT/KR2018/002744, filed on Mar. 8, 2018, which claims priority under 35 U.S.C. 119(a) to Patent Application No. 10-2017-0029519, filed in the Republic of Korea on Mar. 8, 2017, all of which are hereby expressly incorporated by reference into the present application.

TECHNICAL FIELD

Embodiments relate to a camera module, and more particularly to a camera module including a liquid lens.

BACKGROUND ART

People who use portable devices demand optical devices that have high resolution, are small, and have various photographing functions (an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased.

The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens-moving apparatus is used to move the lens module. However, the lens-moving apparatus consumes a lot of power, requires driving members, such as magnets and coils, to move the lens module, and requires extra space corresponding to the moving range of the lens module in order to move the lens module, thus leading to an increase in the overall thickness of a camera module and an optical device.

Therefore, research has been conducted on a liquid lens configured to electrically adjust the curvature of an interface between two kinds of liquid in order to perform autofocus and hand-tremor compensation functions.

DISCLOSURE

Technical Problem

Embodiments provide a camera module including a liquid lens and an optical device, in which the liquid lens is more stably supported inside a holder.

Embodiments provide a camera module including a liquid lens and an optical device, in which the liquid lens is supported in a balanced manner even when a mold seam is formed in the process of manufacturing a holder through injection molding.

Technical Solution

In one embodiment, a camera module may include a liquid lens including an electrode, a holder including a through-hole formed therein and a support portion protruding upwards while enclosing the through-hole so as to allow the liquid lens to be seated thereon, and a stepped surface formed in a region of the support portion in which a mold seam is formed so as to be stepped downwards from the upper surface of the support portion.

The holder may include a first lens disposition portion in which a first lens unit is disposed, a second lens disposition portion in which a second lens unit is disposed, and a liquid lens disposition portion disposed between the first lens disposition portion and the second lens disposition portion to allow the liquid lens to be disposed therein. The through-hole may penetrate the first lens disposition portion, the second lens disposition portion, and the liquid lens disposition portion.

The liquid lens disposition portion may include a first horizontal plate coupled to the first lens disposition portion, a second horizontal plate spaced apart from the first horizontal plate and coupled to the second lens disposition portion, and a vertical plate connecting the first horizontal plate and the second horizontal plate to each other. The support portion may protrude from the second horizontal plate while enclosing the through-hole.

The through-hole may have a circular horizontal cross-section, and the support portion may be disposed so as to concentrically surround the through-hole.

The difference in height between the upper surface of the support portion and the stepped surface may be 20 to 40 µm.

Any one region of the stepped surface may be contiguous with the through-hole.

The mold seam may be formed so as to be elongated across the center of the through-hole, and the stepped surface may be disposed in a pair at opposite edges of the upper surface of the support portion.

The pair of stepped surfaces may be formed by cutting opposite edges of the upper surface of the support portion such that the side of each of the stepped surfaces that is contiguous with the through-hole is perpendicular to the mold seam.

The stepped surfaces may be disposed parallel to the mold seam.

The liquid lens may include a first plate including a cavity formed therein to accommodate a first liquid, which is conductive, and a second liquid, which is non-conductive, therein, a first electrode disposed on the first plate, a second electrode disposed under the first plate, a second plate disposed on the first electrode, and a third plate disposed under the second electrode and seated on the support portion.

The stepped surfaces may be spaced apart from the third plate.

In another embodiment, an optical device may include a camera module, which includes a liquid lens including an electrode, a holder including a through-hole formed therein and a support portion protruding upwards while enclosing the through-hole to allow the liquid lens to be seated thereon, and a stepped surface formed in a region of the support portion in which a mold seam is formed so as to be stepped downwards from the upper surface of the support portion on which a seam is not formed, a control unit converting an image incident through the camera module into an electrical signal, and a display module including a plurality of pixels, the colors of which are changed by the electrical signal.

Advantageous Effects

In the camera module including the liquid lens and the optical device according to the embodiments, the surface of the support portion on which the liquid lens is seated is substantially flattened, thereby enabling more stable support of the liquid lens in the holder.

In addition, even when a mold seam is formed in the process of manufacturing the holder through injection molding, it is possible to support the liquid lens in a balanced manner by forming a stepped portion on the support portion.

DESCRIPTION OF DRAWINGS

FIG. 1 is a view of one example of a camera module,

FIG. 2 is a perspective view of a liquid lens included in the camera module shown in FIG. 1, FIG. 3 is a view showing the cross-section of the liquid lens shown in FIG. 2, FIG. 4 is a perspective view showing the liquid lens and the holder of the camera module shown in FIG. 1, FIG. 5 is a longitudinal sectional view taken along line II-II in FIG. 4, FIG. 6 is a perspective view of the holder before the liquid lens is seated therein in the camera module according to the embodiment, FIG. 7 is a longitudinal sectional view taken along line III-III in FIG. 4, which shows the state in which the liquid lens is seated in the holder shown in FIG. 6, FIG. 8 is a front view of the support portion shown in FIG. 6, and FIG. 9 is a front view of a support portion according to another embodiment.

BEST MODE

Hereinafter, embodiments for accomplishing the aforementioned objects will be described with reference to the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

FIG. 1 is a view of one example of a camera module. The camera module may include a lens assembly 100 and a control circuit 2000.

The lens assembly 1000 may include a liquid lens and/or a solid lens. The liquid lens may include a liquid, a plate, and an electrode. The liquid may include a conductive liquid and a non-conductive liquid, and the electrode may be disposed on or under the plate. In addition, the electrode may include a common terminal and an individual terminal. The common terminal may be single in number, and the individual terminal may be plural in number. The plate may include a first plate, which includes a cavity in which the liquid is disposed, and may further include a second plate, which is disposed on or under the first plate. In addition, the liquid lens may further include a third plate, and the first plate may be disposed between the second plate and the third plate. The shape of the interface formed between the conductive liquid and the non-conductive liquid may be changed in response to the driving voltage applied between the common terminal and each of the individual terminals, and accordingly the focal length may be changed. The control circuit 2000 may supply a driving voltage to the liquid lens, and may be disposed on a sensor board 800 on which an image sensor is disposed. The camera module may further include a connector 3000. The connector 3000 may be connected to the control circuit 2000 via a connection part 3500, and may electrically connect the control circuit 2000 to an external power source or other devices.

The configuration of the control circuit 2000 may be designed differently in accordance with the specifications required for a photography device. In particular, in order to reduce the intensity of the operating voltage to be applied to the lens assembly 1000, the control circuit 2000 may be implemented as a single chip. As a result, it is possible to further reduce the size of the camera module that is mounted in a portable device.

The lens assembly 1000 may include a first lens unit 100, a second lens unit 400, a liquid lens 300, a holder 500, and a cover 600. Any one of the first lens unit 100 and the second lens unit 400 may be omitted.

The illustrated structure of the lens assembly 1000 is just one example, and the structure of the lens assembly 1000 may be changed depending on the specifications required for the camera module.

The first lens unit 100 may be disposed at the front side of the lens assembly 1000, and may receive light incident thereon from the outside of the lens assembly 1000. The first lens unit 100 may include at least one lens, or two or more lenses may be aligned along a center axis to form an optical system. Here, the center axis may be the same as the optical axis of the optical system.

The first lens unit 100 may include two lenses. However, the disclosure is not limited thereto.

An exposure lens (not shown) may be provided on the front surface of the first lens unit 100, and a cover glass may be disposed in front of the exposure lens. The exposure lens may protrude so as to be exposed to the outside of the holder 500, and thus the surface thereof may be damaged. If the surface of the lens is damaged, the quality of the image captured by the camera module may be deteriorated. In order to prevent or minimize damage to the surface of the exposure lens, a method of disposing a cover glass, a method of forming a coating layer, or a method of forming the exposure lens using a wear-resistant material for preventing damage to the surface of the exposure lens may be applied.

The second lens unit 400 may be disposed at the rear of the first lens unit 100 and the liquid lens 300, and the light incident on the first lens unit 100 from the outside may pass through the liquid lens 300 and may be incident on the second lens unit 400. The second lens unit 400 may be spaced apart from the first lens unit 100 and may be disposed in a through-hole formed in the holder 500. The second lens unit 400 may include at least one lens, and when two or more lenses are included, the lenses may be aligned along the center axis to form an optical system.

In order to distinguish the above-described first and second lens units 100 and 400 from the liquid lens 300, the first and second lens units 100 and 400 may be referred to as first and second solid lens units.

The liquid lens 300 may be disposed under the first lens unit 100, and the second lens unit 400 may be disposed under the liquid lens 300. That is, the liquid lens 300 may be disposed between the first lens unit 100 and the second lens unit 400.

FIG. 2 is a perspective view of the liquid lens included in the camera module shown in FIG. 1, and FIG. 3 is a view showing the cross-section of the liquid lens shown in FIG. 2.

Specifically, the liquid lens 300 may include a first plate 310, in which a cavity is formed to accommodate a first liquid 350, which is non-conductive, and a second liquid 340, which is conductive, therein, a first electrode 335 disposed on the first plate 310, a second electrode 345 disposed under the first plate, a second plate 320 disposed on the first electrode 335, and a third plate 330 disposed under the second electrode 345.

The first plate 310 may be disposed between the second plate 320 and the third plate 330, and may include upper and lower openings having a predetermined inclined surface (e.g. an inclined surface having an angle of about 50 to 70 degrees, specifically an angle of 55 to 65 degrees). The region surrounded by the aforementioned inclined surface, the opening contacting the second plate 320, and the opening contacting the third plate 330 may be referred to as a 'cavity'.

The first plate 310 is a structure that accommodates the first and second liquids 350 and 340 therein. Each of the second plate 320 and the third plate 330 may include a region through which light passes, and thus may be made of a light-transmissive material such as, for example, glass. The second plate 320 and the third plate 330 may be made of the same material for convenience of processing.

In addition, the first plate 310 may include impurities so that light does not easily pass therethrough.

The second plate 320 is a structure through which light incident thereon from the first lens unit 100 travels to the interior of the cavity, and the third plate 330 is a structure through which the light that has passed through the cavity travels to the second lens unit 400.

The aforementioned cavity may be filled with the first liquid 350 and the second liquid 340, which have different properties from each other, and an interface may be formed between the first liquid 350 and the second liquid 340. The curvature and the inclination of the interface formed between the first liquid 350 and the second liquid 340 may be changed.

That is, a configuration in which the surface tension of the first and second liquids 350 and 340 is changed using electrical energy may reduce the size of a camera module compared to a configuration in which a focal length is adjusted by moving solid lenses (adjusting the distance between the lenses), and may consume a small amount of power compared to a configuration in which lenses are mechanically moved using a motor or the like.

The first liquid 350 may be oil, e.g. phenyl-based silicon oil.

The second liquid 340 may be made of, for example, a mixture of ethylene glycol and sodium bromide (NaBr).

Each of the first liquid 350 and the second liquid 340 may include at least one of a sterilizing agent or an antioxidant. The antioxidant may be a phenol-based antioxidant or a phosphorus (P)-based antioxidant. The sterilizing agent may be any one of an alcohol-based sterilizing agent, an aldehyde-based sterilizing agent, and a phenol-based sterilizing agent.

The first electrode 335 may be spaced apart from the second electrode 345, and may be disposed on the upper surface, the side surface, and a portion of the lower surface of the first plate 310. The second electrode 345 may be disposed on a portion of the lower surface of the first plate 310, and may be in direct contact with the second liquid 340.

The side surface of the first plate 310 or the side surface of an insulation layer 360 may form the inclined surface or the side wall of the cavity. The first electrode 335 may not be in contact with the first and second liquids 350 and 340, with the insulation layer 360 interposed therebetween, which will be described later. The second electrode 345 may be in direct contact with the second liquid 340.

An electrical signal received from an external sensor board 800 may be applied to the first electrode 335 and the second electrode 345 in order to control the interface between the first liquid 350 and the second liquid 340.

The first electrode 335 and the second electrode 345 may be made of a conductive material, e.g. metal, and specifically may include chrome (Cr). Chromium or chrome is a glossy silver rigid transition metal, which is not fragile, does not readily discolor, and has a high melting point.

Further, since an alloy including chromium exhibits high corrosion resistance and rigidity, chromium may be used in the state of being alloyed with other metals. In particular, since chrome (Cr) is not easily corroded or discolored, chrome exhibits high resistance to the conductive liquid in the cavity.

The insulation layer 360 may be disposed so as to cover the lower surface of the second plate 320 on the upper surface of the cavity, the first electrode 335 forming the side wall of the cavity, the first electrode 335 on the lower surface of the first plate 310, the first plate 310, and a portion of the second electrode 345. The insulation layer 360 may be implemented as, for example, a parylene C coating agent, and may further include a white dye. The white dye may increase the degree to which light is reflected by the insulation layer 360 forming the side wall i of the cavity.

As illustrated, the first liquid 350 may indirectly be in surface contact with the second plate 320, with the insulation layer 360 interposed therebetween, and the second liquid 340 may be in direct surface contact with the third plate 330.

The cavity may include a first opening that is oriented toward the second plate 320 and a second opening that is oriented toward the third plate 330. The cross-sectional size $O_1$ of the first opening may be smaller than the cross-sectional size $O_2$ of the second opening, or vice versa. Here, when each of the first and second openings has a circular cross-section, the size of the openings may refer to a radius thereof, and when each of the openings has a square cross-section, the size of the openings may refer to a diagonal length thereof.

Each of the second plate 320 and the third plate 330 may have rectangular edges. However, the disclosure is not limited thereto.

The first electrode 335 may be exposed from at least one region of the edges of the second plate 320, and the second electrode 345 may be exposed from at least one region of the edges of the third plate 330.

In addition, a first connection electrode 356 may be disposed on the first electrode 335 in the outer region of the second plate 320, and a second connection electrode 346 may be disposed on the second electrode 345 in the outer region of the third plate 330.

Although not illustrated, a conductive epoxy may be disposed between the first electrode 335 and the first connection electrode 356, and may also be disposed between the second electrode 345 and the second connection electrode 346.

The first connection electrode 356 may be integrally formed with the first electrode 335, and the second connection electrode 346 may be integrally formed with the second electrode 345.

The first connection electrode 356 and the second connection electrode 346 may be connected to a metal plate via a connection board 380, and may be electrically connected to terminals 810 of a flexible sensor board 800.

As shown in FIG. 1, the holder 500 may include an open upper portion, an open lower portion, and a through-hole formed therein. The holder 500 may include a first body portion including a first hole formed therein, a second body portion including a second hole formed therein, and a side portion connecting the first body portion and the second body portion to each other. The side surface of the holder may include at least one side hole formed therein. The side surface of the holder may include a first side hole and a second side hole formed therein. The first side hole and the second side hole may be disposed opposite each other while being spaced apart from each other. The first lens unit 200, the second lens unit 400, and the liquid lens 300 may be disposed in the through-hole formed in the holder 500. In detail, the first lens unit 100 may be disposed in the upper portion of the holder 500 and may be coupled thereto, and the second lens unit 400 may be disposed in the lower portion of the holder 500 and may be coupled thereto.

The liquid lens 300, the first lens unit 100 disposed on the liquid lens, and the second lens unit 400 disposed under the liquid lens may be disposed in the holder 500 so as to be fixed thereto. The liquid lens 300 may be aligned along the center axis in the same manner as the first lens unit 100 and the second lens unit 400. The first lens unit may be disposed in the first hole, and the second lens unit may be disposed in the second hole.

First to third regions may be provided inside the holder 500. The first lens unit 100 may be inserted into the first region, the liquid lens 300 may be disposed in the second region, and the second lens unit 400 may be disposed in the third region. Here, the first region may be located on the second region, and the third region may be located under the second region. The aforementioned through-hole formed in the holder 500 may include the first to third regions.

The second region may include an opening, which is formed in the side surface of the holder 500 so as to allow the liquid lens 300 to be inserted into the holder therethrough. Thus, the liquid lens 300 may be inserted into the holder 500 through the side opening formed in the holder 500, and may be accommodated in the second region of the holder 500.

The liquid lens 300 accommodated in the holder 500 may be electrically connected to the terminals 810 of the sensor board 800 using the connection board 380, which is exposed to the outside of the holder 500. Here, the connection board 380 may be, for example, a flexible printed circuit board.

The connection board 380 may include an upper terminal unit including a plurality of terminals and a lower terminal unit including a plurality of terminals. The upper terminal unit may be coupled to the first and second connection electrodes 356 and 346 of the liquid lens 300, and thus may be connected to the first electrode 335 or the second electrode 345. Although it is illustrated in FIG. 3 that the upper terminal unit of the connection board 380 is connected to the second electrode 345 of the liquid lens 300, the upper terminal unit of the connection board 380 may be connected to the first electrode 335. Alternatively, the upper terminal unit of the connection board 380 may be integrated with the first and second connection electrodes 356 and 346 so as to be connected to the first electrode 335 or the second electrode 345 of the liquid lens 300.

The cover 600 may be disposed so as to surround the first lens 100, the second lens 400, the liquid lens 300, and the holder 500. The cover 600 and the holder 500 may be disposed on a base 700.

The base 700 may be integrally formed with the holder 500. The holder 500 may act as the base 700 as needed. At this time, the base 700 may be omitted.

The sensor board 800 may be disposed under the base 700, and may include an image sensor (not shown) and terminals 810. A light-receiving element of the image sensor may be provided in the sensor board 800. The width and/or the length of a unit pixel of the image sensor may be, for example, 2 µm (micrometers) or less. The terminals 810 may supply current to the first and second electrodes 335 and 345 (refer to FIG. 2) of the liquid lens 300 using the connection board 380.

FIG. 4 is a perspective view showing the liquid lens and the holder of the camera module shown in FIG. 1, and FIG. 5 is a longitudinal sectional view taken along line II-II in FIG. 4.

As shown in FIG. 4, the above-described holder 500 may be formed through injection molding, and may include a first lens disposition portion 510, which includes the first region in which the first lens unit 100 is disposed, a liquid lens disposition portion 520, which includes the side opening through which the liquid lens 300 is inserted and the second region in which the liquid lens 300 is disposed, and a second lens disposition portion 530, which includes the third region in which the second lens unit 400 is disposed.

Injection molding is a method of obtaining products by forcibly injecting plastic materials, such as plastic, melted by heat into an injection mold, and then solidifying the same. In general, an injection mold includes an upper mold (or a first mold) and a lower mold (or a second mold), which are separated from each other. When injection molding is performed, an injection process is performed after the upper mold and the lower mold are joined to each other.

After the product is solidified in the injection mold, the upper mold and the lower mold are separated from each other. During the manufacturing process using injection molding, molten material may minutely flow into the join portion between the molds. Therefore, when the molds are separated from each other, a fine linear protruding portion or depressed portion (hereinafter referred to as a "mold seam") may be formed in the surface of the product.

Referring to FIG. 5 showing the longitudinal section taken along line II-II in FIG. 4, it can be seen that the liquid lens 300 is placed on a support portion 524 when the liquid lens 300 is disposed in the liquid lens disposition portion 520.

As shown in an enlarged manner in FIG. 5, since the holder 500 is manufactured through injection molding, a protruding portion due to the aforementioned mold seam 523a may be formed at the support portion 524. The protruding portion may be located on the upper surface of the support portion 524, and may have a linear shape. The mold seam 523a may be brought into contact with the third plate 330 of the liquid lens 300, and thus the liquid lens 300 may not be balanced but may be tilted or move unstably, which may adversely affect the performance of the camera module.

Therefore, the structure of the holder 500 that is capable of more stably supporting the liquid lens 300 in the holder 500 will be described with reference to FIGS. 6 to 9.

FIG. 6 is a perspective view of the holder before the liquid lens is seated therein in the camera module according to the embodiment, FIG. 7 is a longitudinal sectional view taken along line III-III in FIG. 4, which shows the state in which the liquid lens is seated in the holder shown in FIG. 6, FIG. 8 is a front view of the support portion shown in FIG. 6, and FIG. 9 is a front view of a support portion according to another embodiment.

As shown in FIG. 6, the holder includes the first lens disposition portion 510, in which the first lens unit 100 is disposed, the second lens disposition portion 530, in which the second lens unit 200 is disposed, and the liquid lens disposition portion 520, which is disposed between the first lens disposition portion 510 and the second lens disposition portion 530 to allow the liquid lens 300 to be disposed therein. Here, the through-hole is formed so as to penetrate the first lens disposition portion 510, the second lens disposition portion 530, and the liquid lens disposition portion 520.

Here, the liquid lens disposition portion 520 includes the support portion 524, which protrudes upwards inside the holder 500 so as to enclose the through-hole 501 (refer to FIG. 8) in order to allow the liquid lens 300 to be seated thereon.

For example, the through-hole 501 may have a circular horizontal cross-section, and the support portion 524 may be disposed so as to concentrically surround the through-hole 501. In some embodiments, the horizontal cross-section of the through-hole 501 may have an oval or polygonal shape, and the support portion 524 may be modified so as to enclose the circumference of the through-hole 501 while corresponding to the horizontal cross-section of the through-hole 501.

In more detail, the liquid lens disposition portion 520 may include a first horizontal plate 521, a second horizontal plate 523, and a vertical plate 522. The first horizontal plate 521 may be a first body portion, the second horizontal plate 523 may be a second body portion, and the vertical plate 522 may be a side portion. The first horizontal plate may include a first hole formed therein, and the second horizontal plate may include a second hole formed therein. The second horizontal plate 523 may correspond to an extension portion. The second horizontal plate or the second body portion may further include the support portion 524, which protrudes toward the liquid lens to support the liquid lens.

The first horizontal plate 521 may be disposed in the upper region of the holder 500, and may be coupled to the first lens disposition portion. The second horizontal plate 523 may be disposed below the first horizontal plate 521 so as to be spaced apart from the first horizontal plate 521, and may be coupled to the second lens disposition portion 530. The vertical plate 522 connects the first horizontal plate 521 and the second horizontal plate 523 to each other in order to form the second region, which is a space in the holder 500 in which the liquid lens 300 is disposed. The vertical plate 522 may include a pair of left and right pieces so as to connect opposite edges of the first horizontal plate 521 and opposite edges of the second horizontal plate 523 to each other.

The support portion 524 may be formed so as to protrude from the second horizontal plate 523 while enclosing the through-hole 501. The support portion 524 may be formed such that a stepped surface 524b is formed in the region of the support portion 524 in which the above-described mold seam 523a is formed. The support portion 524 may include a side surface and an upper surface, and may further include a step between the side surface and the upper surface. The step may be two or more in number. Among the plurality of steps, at least two steps may be parallel to each other. The steps may be disposed at locations corresponding to the side portion of the holder. The interval between the steps, which are parallel to each other, may be smaller than the diameter of the second hole. The height of each step may be 20 to 40 μm.

The stepped surface 524b may have a shape that is stepped downwards from the upper surface 524a of the support portion 524. The stepped surface 524b may be disposed in a pair at opposite edges of the upper surface 524a of the support portion 524.

In this case, the stepped surface 524b may be formed such that any one region thereof is contiguous with the through-hole 501.

Even when the mold seam 523a, which is a protruding portion protruding from the upper surface of the second body portion, is formed in the process of manufacturing the holder 500 through injection molding, the stepped surface 524b having the above structure may prevent the liquid lens 300 from being tilted or shaken by the support portion 524 supporting the liquid lens 300. The protruding portion protruding from the upper surface of the second body portion may have a linear shape. The step may be disposed perpendicular to the protruding portion.

The protruding portion or the mold seam 523a may be formed so as to be elongated across the center of the through-hole 501. For example, the mold seam 523a may protrude from the upper surface of the second horizontal plate 523 of the liquid lens disposition portion 520 so as to cross the center of the through-hole 501, and may also be formed so as to protrude from the upper region of the stepped surface 524b.

However, since the stepped surface 524b has a lower height than the support portion 524, as shown in FIG. 7, the third plate 330 of the liquid lens 300 is spaced apart from the stepped surface 524b, and thus is not affected by the mold seam 523a. As a result, the liquid lens 300 may be supported by the support portion 524 in a stable and balanced manner.

In FIG. 7, the third plate 330 of the liquid lens 300 is illustrated as being slightly spaced apart from the upper surface 524a of the support portion 524. However, this is exaggerated merely for the purpose of illustration. The lower surface of the third plate 330 of the liquid lens 300 is brought into close contact with the upper surface 524a of the support portion 524, with the result that the liquid lens 300 is supported by the support portion 524 in a stable and balanced manner.

In order to achieve the above effects, the upper surface 524a of the support portion 524 and the stepped surface 524b may have a difference in height of 20 to 40 μm therebetween. However, this height difference may be modified without being limited to this specific range, so long as it is greater than the height of the mold seam 523a formed at the support portion 524.

As shown in FIG. 8, a pair of stepped surfaces 524b may be formed by cutting opposite edges of the upper surface 524a of the support portion 524 such that the side of each of the stepped surfaces 524b that is contiguous with the through-hole 501 is perpendicular to the mold seam 523a. This structure may be directly realized using a mold in the injection molding process, or may be realized through a cutting process or the like for removing the mold seam 523a formed on the upper surface 524a of the support portion 524 after the injection molding process. Accordingly, the mold seam 523a is not substantially formed on the upper surface 524a of the support portion 524, which supports the liquid lens 300.

In another embodiment, as shown in FIG. 9, a stepped surface 524-b1 may be disposed parallel to the mold seam 523a. In this case as well, the stepped surface 524-b1 may be disposed in a pair so as to correspond to each other. The width of each of the stepped surfaces 524-b1 may be set to any value within the range within which the liquid lens 300 is supported in a balanced manner by removing the mold seam 523a from the upper surface 524a-1 of the support portion 524.

In this embodiment, the stepped surface 524-b1 may be directly realized using a mold in the injection molding process, or may be realized through a cutting process or the like for removing the mold seam 523*a* formed on the upper surface 524*a*-1 of the support portion 524 after the injection molding process.

In the camera module including the liquid lens and the optical device according to the embodiments, the surface of the support portion on which the liquid lens is seated is substantially flattened, thereby enabling more stable support of the liquid lens in the holder.

In addition, even when a mold seam is formed in the process of manufacturing the holder through injection molding, it is possible to support the liquid lens in a balanced manner by forming a stepped portion on the support portion.

The camera module including the above-described liquid lens may be mounted in various digital devices, such as a digital camera, a smartphone, a laptop computer, and a tablet PC. In particular, the camera module may be mounted in mobile devices to realize an ultra-thin high-performance zoom lens.

For example, a display device, in which the camera module, including the liquid lens, the first and second lens units, the filter, and the light-receiving element, converts an image incident from the outside into an electrical signal, may include a display module including a plurality of pixels, the colors of which are changed by the electrical signal. The display module and the camera module may be controlled by a control unit.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

INDUSTRIAL APPLICABILITY

A camera module including a liquid lens according to the embodiment may be used in mobile devices.

The invention claimed is:

1. A camera module, comprising:
a liquid lens comprising an electrode; and
a holder in which the liquid lens is disposed,
wherein the holder comprises:
   a first body portion comprising a first hole formed therein;
   a second body portion spaced apart from the first body portion, the second body portion comprising a second hole formed therein so as to correspond to the first hole; and
   a side portion connecting the first body portion and the second body portion to each other,
wherein the second body portion comprises a support portion supporting the liquid lens and an extension portion extending from the support portion,
wherein the support portion comprises a side surface, an upper surface, and a step formed between the side surface and the upper surface,
wherein the liquid lens comprises:
   a first plate comprising a cavity formed therein to accommodate a first liquid, which is conductive, and a second liquid, which is non-conductive;
   a first electrode disposed on the first plate;
   a second electrode disposed under the first plate;
   a second plate disposed on the first electrode; and
   a third plate disposed under the second electrode and seated on the support portion, and
wherein the electrode includes the first and second electrodes.

2. The camera module according to claim 1, wherein a first lens unit comprising at least one lens is disposed in the first hole,
wherein a second lens unit comprising at least one lens is disposed in the second hole,
wherein the liquid lens is disposed between the first lens unit and the second lens unit, and
wherein the support portion protrudes from the extension portion toward the liquid lens.

3. The camera module according to claim 1, wherein the second hole has a circular horizontal cross-section, and
wherein at least a portion of a stepped surface of the step is contiguous with the second hole.

4. The camera module according to claim 1, wherein the step is disposed so as to correspond to the side portion.

5. The camera module according to claim 1, wherein the step includes at least two steps.

6. The camera module according to claim 1, wherein the step has a height of 20 to 40 μm.

7. The camera module according to claim 1, wherein the second body portion comprises a protruding portion protruding upwards from an upper surface thereof in a linear shape.

8. The camera module according to claim 7, wherein the step is disposed such that one side thereof that is contiguous with the second hole is perpendicular to the protruding portion.

9. The camera module according to claim 1, wherein the step is spaced apart from the third plate.

10. The camera module according to claim 1, wherein a stepped surface of the step has a shape that is stepped downwards from the upper surface of the support portion.

11. The camera module according to claim 5, wherein the at least two steps are parallel to each other.

12. The camera module according to claim 11, wherein an interval between the at least two steps, which are parallel to each other, is smaller than a diameter of the second hole.

13. The camera module according to claim 7, wherein a stepped surface of the step includes a pair of stepped surfaces disposed at opposite edges of the upper surface of the support portion.

14. The camera module according to claim 13, wherein each of the pair of stepped surfaces includes a side that is contiguous with the second hole and is perpendicular to the protruding portion.

15. The camera module according to claim 14, wherein the pair of stepped surfaces correspond to surfaces formed by cutting opposite edges of the upper surface of the support portion.

16. The camera module according to claim 7, wherein a difference in height between the upper surface of the support portion and the stepped surface of the step is greater than a height of the protruding portion.

17. The camera module according to claim 7, wherein the protruding portion is elongated across a center of the second hole.

18. The camera module according to claim 1, wherein a lower surface of the third plate is brought into close contact with the upper surface of the support portion.

19. An optical device comprising the camera module according to claim 1.

* * * * *